Patented May 8, 1934

1,957,918

UNITED STATES PATENT OFFICE 1,957,918

PROCESS OF MAKING SULPHUR SOAP

Tomoichiro Tanaka, Hongo-Ku, Tokyo, Japan

No Drawing. Application September 9, 1932,
Serial No. 632,397. In Japan September 18,
1931

5 Claims. (Cl. 87—16)

This invention relates to a sulphur-soap, and its object is to provide a soap which does not liberate hydrogen sulphide of a disagreeable odor when in use, while it is more effective in cleaning and sterilizing of the skin.

A further object of this invention is to prevent a deterioration of the product.

This invention essentially involves sulphur soap wherein resin soap mixed and melted with sulphur is added to a mixture of iodine-starch and vaseline, and further mixed with pure soda soap or preferably potassium soap and thoroughly kneaded so as to form a homogeneous mass.

For carrying this invention into practice according to one form, a sulphur mixture, iodine-starch and pure soap material are suitably mixed and kneaded. The sulphur mixture is prepared by mixing resin soap with an equal quantity of sulphur. Iodine starch is prepared by adding a 10 per cent alcoholic solution of iodine to a 10 per cent plastic solution of wheat starch, so that the actual proportions of iodine to starch may range from 1 to 1 by weight to 1 to 5, then by evaporating and drying the iodine starch thus formed at a low temperature, and by mixing the dried mass with a half quantity of vaseline, wax, fat, or the like, so as to form a homogeneous plastic mass. The soap material is composed of ordinary pure soda soap or potassium soap. Two parts of the sulphur mixture are mixed with one part of the iodine starch and ten parts of the soap material, and then a small quantity of a perfume or the like is added to the mixture. After the whole has been thoroughly mixed and kneaded so as to form a homogeneous mixture, the mass is moulded and stamped. It is then ready for use. Or it may be used in the form of cream.

In the use of sulphur soap made by the process of this invention as above-mentioned, hydrogen sulphide is produced by the coherent action of sulphur-containing soap, but it is immediately dispersed in soap bubbles and is oxidized at once in contact with minute particles of iodine starch so as to liberate minute particles of sulphur. The hydrogen iodide thus formed is neutralized by a caustic alkali, whereby no disagreeable odor is produced, and cleaning and sterilizing actions upon the skin take place. As this product does not contain a peroxide or volatile substance, there is no fear of the product becoming deteriorated by the influence of moisture, and the powerful actions of the soap are retained by the stable iodine starch even if kept for a long time, and a special sterilizing action or the like is caused by the iodine and iodine compound.

Among the materials used in this process, resin soap is adapted not only easily to disperse sulphur owing to its readily soluble and bubble-forming properties, but it has a certain action as an oxidizing catalyzer. Vaseline, wax or the like serves to cover the particles of iodine starch so as to prevent their contact with the other materials. As the action of the alkali is more or less prevented by the said substance when the soap is used, the stimulating action of the alkali on the skin is moderated.

Having now particularly described and ascertained the nature of my said invention and in what manner the same is to be performed, I declare that what I claim is:—

1. A substantially odorless sulphur soap comprising approximately one part sulphur, one part resin soap, one part of a two to one mixture of iodized starch and an oily or waxy body such as vaseline, and about ten parts of an alkali soap.

2. A substantially odorless sulphur soap comprising approximately one part sulphur, one part resin soap, one part of a two to one mixture of iodized starch and an oily or waxy body such as vaseline, the starch and iodine in said iodized starch being substantially equal in proportion, and about ten parts of an alkali soap.

3. A substantially odorless sulphur soap comprising one part of sulphur combined with an approximately equal part of resin soap, approximately one part of a two to one mixture of iodized starch and an oily or waxy body such as vaseline wherein the latter serves to coat and protect the starch particles, the proportions of the starch and iodine being about equal, and a potassium soap incorporated with the whole.

4. A sulphur soap according to claim 1 wherein the alkali soap is a potassium soap.

5. A substantially odorless sulphur soap comprising approximately one part sulphur, one part resin soap, one part of a two to one mixture of iodized starch and an oil or waxy body such as vaseline or the like, the starch and iodine in said iodized starch being present in relative proportions ranging from substantial equality by weight, to five times as much starch as iodine, and about ten parts of an alkali soap.

TOMOICHIRO TANAKA.